United States Patent
Lynch et al.

(10) Patent No.: US 8,830,055 B2
(45) Date of Patent: Sep. 9, 2014

(54) SYSTEMS AND METHODS FOR ENERGY CONSERVING WIRELESS SENSING WITH SITUATIONAL AWARENESS

(75) Inventors: Michael A. Lynch, Shelburne, VT (US); Radoslaw R. Zakrzewski, South Burlington, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 70 days.

(21) Appl. No.: 13/274,098

(22) Filed: Oct. 14, 2011

(65) Prior Publication Data

US 2012/0095622 A1 Apr. 19, 2012

Related U.S. Application Data

(60) Provisional application No. 61/393,456, filed on Oct. 15, 2010, provisional application No. 61/455,169, filed on Oct. 15, 2010, provisional application No. 61/455,170, filed on Oct. 15, 2010.

(51) Int. Cl.
| | |
|---|---|
| G06F 17/40 | (2006.01) |
| G08B 29/02 | (2006.01) |
| B64D 47/00 | (2006.01) |
| B64D 45/00 | (2006.01) |
| B64C 25/00 | (2006.01) |

(52) U.S. Cl.
CPC ............ B64D 45/0005 (2013.01); Y02T 50/53 (2013.01); B64D 2045/008 (2013.01); B64C 25/00 (2013.01)
USPC .......................... 340/539.3; 701/29.1; 73/763

(58) Field of Classification Search
USPC ................ 701/3, 29.1; 340/3.1, 539.22, 531, 340/539.3, 960, 945, 539.1; 73/763; 702/188; 244/75.1

See application file for complete search history.

(56) References Cited

U.S. PATENT DOCUMENTS

| | | | |
|---|---|---|---|
| 6,070,662 A * | 6/2000 | Ciglenec et al. | 166/254.1 |
| 7,747,415 B1 * | 6/2010 | Churchill et al. | 702/187 |
| 8,011,255 B2 * | 9/2011 | Arms et al. | 73/862.325 |
| 8,301,914 B2 * | 10/2012 | Gelonese | 713/300 |
| 2003/0069670 A1 * | 4/2003 | Osinga | 700/275 |
| 2003/0071165 A1 * | 4/2003 | Fiebick et al. | 244/3.1 |
| 2003/0152145 A1 * | 8/2003 | Kawakita | 375/240.12 |
| 2004/0150529 A1 * | 8/2004 | Benoit et al. | 340/679 |
| 2006/0187017 A1 * | 8/2006 | Kulesz et al. | 340/506 |
| 2008/0196945 A1 * | 8/2008 | Konstas | 178/18.03 |
| 2008/0282817 A1 * | 11/2008 | Breed | 73/865.9 |
| 2009/0179751 A1 * | 7/2009 | Forster | 340/501 |
| 2009/0216398 A1 * | 8/2009 | Lynch et al. | 701/30 |
| 2010/0063777 A1 * | 3/2010 | Berkcan et al. | 702/188 |
| 2010/0090822 A1 * | 4/2010 | Benson et al. | 340/508 |
| 2010/0141377 A1 * | 6/2010 | Andarawis et al. | 340/3.1 |

(Continued)

*Primary Examiner* — Calvin Cheung
*Assistant Examiner* — Courtney Heinle
(74) *Attorney, Agent, or Firm* — Edwards Wildman Palmer LLP; Scott D. Wofsy; Joshua L. Jones

(57) ABSTRACT

A system and method is provided for monitoring aircraft health and status using a situation-aware sensing system. The system includes an independent power source, a sensor that continuously measures a signal of interest to yield sensor data, and a processor that compares the sensor data to threshold data. The processor adjusts an operational parameter of the situation-aware sensing system to conserve power when the sensor data does not exceed the threshold data. The processor further adjusts the operational parameter of the situation-aware sensing system to stop conserving power when the sensor data exceeds the threshold data.

16 Claims, 5 Drawing Sheets

(56) References Cited

U.S. PATENT DOCUMENTS

| | | | |
|---|---|---|---|
| 2011/0035054 A1* | 2/2011 | Gal et al. | 700/258 |
| 2012/0043417 A1 | 2/2012 | Eriksen et al. | |
| 2012/0046799 A1* | 2/2012 | Alex et al. | 700/298 |
| 2012/0095702 A1 | 4/2012 | Baird | |
| 2012/0095703 A1 | 4/2012 | Zakrzewski et al. | |
| 2012/0101770 A1* | 4/2012 | Grabiner et al. | 702/141 |
| 2012/0306377 A1* | 12/2012 | Igaki et al. | 315/151 |
| 2013/0135994 A1* | 5/2013 | Michel et al. | 370/229 |
| 2013/0154829 A1* | 6/2013 | Mostov | 340/539.13 |

* cited by examiner

SYSTEMS AND METHODS FOR ENERGY CONSERVING WIRELESS SENSING WITH SITUATIONAL AWARENESS

CROSS-REFERENCE TO RELATED APPLICATIONS

This application claims benefit of priority from U.S. Provisional Application Ser. No. 61/455,170, filed Oct. 15, 2010, U.S. Provisional Application Ser. No. 61/455,169, filed Oct. 15, 2010, and U.S. Provisional Application Ser. No. 61/393,456, filed Oct. 15, 2010, each of which are incorporated by reference herein in their entirety.

BACKGROUND OF THE INVENTION

1. Field of the Invention

The present invention is directed to systems and methods for monitoring the health and status of an aircraft, via sensors, and more particularly to energy conserving methods and systems for sensor systems used to evaluate the health and status of the aircraft.

2. Description of the Related Art

A typical aircraft sensing system includes a processor (e.g., a microcontroller), a memory, a sensing element, and a power source. The power source can either be dependent, e.g., from an aircraft power bus, or independent, e.g., a battery. Design of the aircraft sensing system using independent power sources offers an advantage of monitoring events that occur when aircraft power is not on, e.g., towing operations. Still further, independent power sources offer potential weight saving advantage due to the removal of electrical wiring, e.g., power and data transmission wiring. However, this weight saving advantage must be balanced against factors such as a weight of the power source and requisite performance characteristics of the sensors, e.g., the amount of time the sensor is operational and the acuteness of sensor data. Typically, greater performance characteristics, e.g., longer operation times and more acute sensor data, require the sensor to operate at a higher energy state and, thus, draw more power. In fact, continuous operation of the sensor may require a significant power draw, limiting the useful battery life. If the battery is depleted and the system stops operating before measuring the data associated with a particular event, the event will go undetected.

Conventional techniques for conserving energy in aircraft sensing systems having an independent power source are often designed to operate in a sleep mode until sensing are required. According to these techniques, the sleep mode can be accomplished using a timer. The timer-based sleep mode turns off the sensing system during the sleep mode, and turns on the sensing system during a wake mode after a predetermined amount of time has passed. During the sleep mode, the processor is configured to store the current state of registers and/or memory, and cease all other activity, such as data collection. A timer periodically wakes the sensing system to measure a desired value, generate sensor data, transmit the sensor data, and enter the sleep mode again. The fraction of time the sensor is in a wake state is typically referred to as a duty cycle. In order for the energy use of the system to be low, the duty cycle needs to be very low, e.g., the sensing system remains in the sleep mode for a larger period of time in relation to the wake mode. However, this timer-based sensing system loses situational awareness during sleep mode since, during sleep mode, the sensing system is inactive and, accordingly, the system does not collect nor provide sensor data. Moreover, while in sleep mode, these sensors fail to monitor potentially dangerous and detrimental aircraft events, e.g., dramatic changes in pressure, temperature, vibration and strain. Ultimately, this can lead to unsafe aircraft conditions since the timer-based sensing system remains unavailable until the timer wakes the sensing system at predetermined times.

Therefore, there is a need for an aircraft sensing system that conserves energy, yet preserves situational awareness and continuously monitors for potentially dangerous and detrimental aircraft events.

SUMMARY OF THE INVENTION

Existing or previously proposed monitoring systems focus on energy conservation by turning off a sensor, but, ultimately, fail to maintain situational awareness, e.g., record sensor data, if an event occurs when the sensor is turned off. During these "sleep" periods conventional sensors neglect important measurements of events that can lead to potentially dangerous and detrimental aircraft conditions. Accordingly, the systems and methods disclosed herein allow for preservation of situation-awareness and still balance power conservation.

To address this need, there is provided a situation-aware sensing system for aircraft monitoring that includes, among other elements, an independent power source, a sensor that continuously measures a signal of interest to yield sensor data, and a processor that compares the sensor data to threshold data. The processor adjusts an operational parameter of the situation-aware sensing system to conserve power when the sensor data does not exceed the threshold data, and the processor adjusts the operational parameter of the situation-aware sensing system to stop conserving power when the sensor data exceeds the threshold data. Typically, the sensor and the processor continuously draw power from the independent power source.

In some embodiments, power is conserved by adaptively changing the operational parameters such as a sensor sampling rate and a data resolution. In particular, sensor data is acquired less frequently when measured conditions do not exceed the threshold data. In some embodiments, sensor data is acquired less frequently when the sensor data remains unchanged. Further, sensor data is acquired more frequently if rapid changes are detected in the measured conditions and/or threshold conditions are exceeded. This adaptive change in sensor sampling rate reduces the average power draw and extends battery life.

The system can further include a memory, which stores the sensor data when the sensor data exceeds the threshold data to yield an event record. The system can further include a wireless transceiver, and an access point—both in communication with the processor. It is envisioned that the processor transmits the event record from the memory to the access point, via the wireless transceiver.

In some embodiments, the sensor is a first sensor and the system further includes a second sensor that continuously measures a different signal of interest. The processor further compares the different signal of interest to a period of time to determine if a transient condition is present, and the processor adjusts the operational parameter of the situation-aware sensing system to conserve power if the transient condition is present, regardless of the threshold data.

The present invention is also directed to a method for aircraft monitoring that includes, among other steps, continuously drawing power from an independent power source, continuously measuring a signal of interest to yield sensor data, and comparing the sensor data to threshold data. Ultimately, this method provides for adjusting an operational parameter of a situation-aware sensor to conserve power when the sensor data does not exceed the threshold data, and adjusting an operational parameter of the situation-aware sensor to stop conserving power when the sensor data exceeds the threshold data.

Still further, in some embodiments a situation-aware sensing system for aircraft monitoring is provided. This system includes an independent power source, a sensor that continuously measures a signal of interest to yield sensor data, and a processor that is configured to adjust an operational parameter of the situation-aware sensing system to conserve power when the sensor data is within a first operational range. The processor further adjusts the operational parameter of the situation-aware sending system to stop conserving power when the sensor data is within a second operational range.

In certain embodiments, the method further includes continuously measuring a different signal of interest, comparing the different signal of interest over a period of time to determine if a transient condition is present, and adjusting an operational parameter of the situation-aware sensing system to conserve power if the transient condition is present regardless of the comparison of the sensor data to the threshold data.

These and other features and benefits of the subject invention and the manner in which it is assembled and employed will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art to which the subject invention appertains will readily understand how to make and use the systems and method of the subject invention without undue experimentation, preferred embodiments thereof will be described in detail hereinbelow with reference to certain figures, wherein.

DETAILED DESCRIPTION OF PREFERRED EMBODIMENTS

Disclosed herein are detailed descriptions of specific embodiments of the systems and methods for monitoring the health and status of aircraft landing gear. It will be understood that the disclosed embodiments are merely examples of ways in which certain aspects of the invention can be implemented and do not represent an exhaustive list of all of the ways the invention may be embodied. Indeed, it will be understood that the systems, devices, and methods described herein may be embodied in various and alternative forms. The figures are not necessarily to scale and some features may be exaggerated or minimized to show details of particular components. Well-known components, materials or methods are not necessarily described in great detail in order to avoid obscuring the present disclosure.

Figures illustrating the components show some elements that are known and will be recognized by those skilled in the art. The detailed descriptions of such elements are not necessary to an understanding of the invention, and accordingly, are herein presented only to the degree necessary to facilitate an understanding of the novel features of the present invention.

Figure 1:
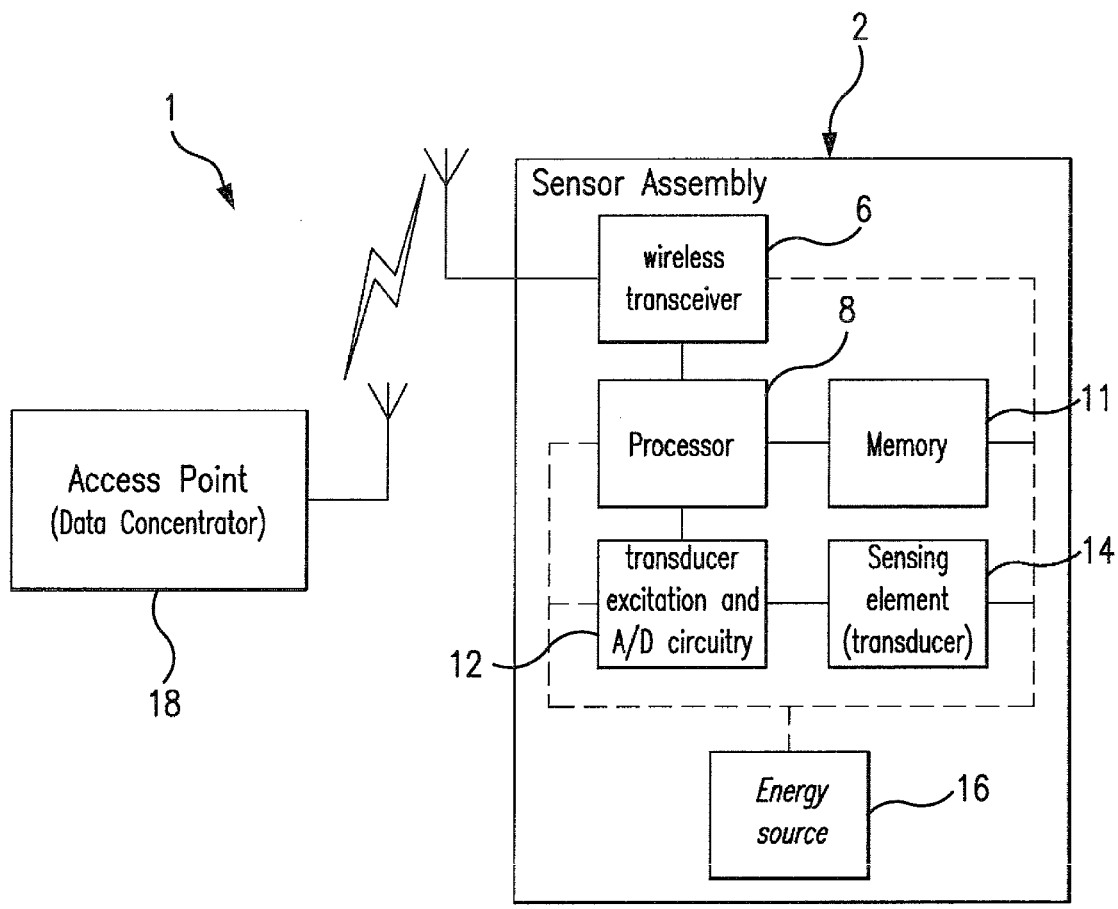
FIG. 1 is a block diagram of a health and status monitoring system which has been constructed in accordance with an exemplary embodiment of the present invention.

Referring now to the drawings wherein similar reference numerals identify similar structural features or aspects of the subject invention, there is illustrated in FIG. 1, health and status monitoring system which has been constructed in accordance with an embodiment of the present invention which has been designated as reference numeral 1.

FIG. 1 illustrates a sensor 2 that includes a wireless transceiver 6, a processor 8, a memory 11, a transducer excitation and A/D circuitry 12, a sensing element 14, and an energy source 16. In addition, sensor 2 communicates, via wireless transceiver 6, with an access point 18. FIG. 1 illustrates a single sensor, i.e., sensor 2, however, multiple sensors can be employed.

Sensor 2 is a general sensor that can measure aircraft and flight conditions such as, but not limited to: vibration, temperature, pressure, and strain. For example, sensor 2 can be used to monitor vibration in rotorcraft such as the sensor systems disclosed in U.S. patent application Ser. No. 12/924,466, herein incorporated by reference in its entirety. As illustrated, sensor 2 includes sensing element 14, e.g., a transducer, which converts physical variations into an electrical signal, e.g., sensor data.

Sensor 2 operates by drawing power from energy source 16. Energy source 16 can include, but is not limited to energy storage devices, e.g., batteries and capacitors, and energy harvesters such as those disclosed in U.S. patent application Ser. No. 12/931,441, herein incorporated by reference in its entirety.

In operation, sensing element 14 senses conditions, e.g., a vibration, which is translated into an electrical signal by transducer excitation and A/D circuitry 12. Transducer excitation and A/D circuitry is represented as separate from processor 8, however, in some embodiments, this circuitry is integrated into processor 8. As illustrated, processor 8 receives and processes the electrical signal as sensor data, and stores the sensor data in memory 11. Processor 8 further transmits the sensor data to access point 18, via wireless transceiver 6.

Although sensor 2 is represented herein as having a single processor, i.e., processor 8, it is not limited to such, but instead can be coupled to other devices in a distributed processing system. In addition processor 8 is an electronic device configured of logic circuitry that responds to and executes instructions. Memory 11 is a processor-readable medium encoded with a program. In this regard, memory 11 stores data and instructions that are readable and executable by processor 8 for controlling the operation of processor 8. Memory 11 may be implemented in a random access memory (RAM), a hard drive, a read only memory (ROM), or a combination thereof.

Energy source 16 is an independent energy source that powers sensor 2. An advantage of sensor 2 over traditional/conventional sensors is an adjustment of the operational parameters based on measured signals, such that power consumption is minimized and power available from energy source 16 is greatly extended. In particular, operational parameters can include but is not limited to a sensor sampling rate and a digital data resolution, since in most instances, power consumed increases with higher sample rates and higher digital data resolution due to an increase in the amount of processing performed by the processor and memory. For example, system 1 increases the sampling rate and/or signal resolution (e.g., data acquisition resolution) during the periods when sensor measurements meet or exceed an operational threshold, which could indicate that detection of an event is more likely. In contrast, when measured values are within an operational threshold, or the rate of change of values over time is minimal, sensor 2 decreases the sampling rate and data resolution to limit the power draw from energy source 16. This feature allows sensor 2 to remain operational for extended periods of time and avoid any "sleep" mode.

Sensor 2 continuously measures values to quickly adjust operational parameters to accurately detect an event. Continuously includes periodic measuring and predetermined interval measuring.

As used herein, an event is defined as an occurrence of a potentially dangerous and detrimental aircraft condition. Events include, but are not limited to, vibrations, temperatures, pressures and strains that occur in excess, e.g., higher or lower, of normal aircraft operations. For example, excessive strains can produce and overload condition whereby components of a landing gear exceed design limits. Further, these events can occur at any time, even when the aircraft is powered down and merely being towed. Accordingly, each event typically warrants a dedicated set of sensors that are configured to take measurements during probable occurrence of a particular event.

For example, sensor 2 can be configured to measure temperature. Events that relate to excessive temperatures occur at or around an aircraft engine. Accordingly, sensor 2 can be mounted on an engine component or exhaust port.

Each event further corresponds to the aircraft's operational thresholds. Operational thresholds, or simply thresholds as used herein, are operational ranges for normal aircraft operation. These thresholds can include a range of values and a range of rates of change for values. It is understood that the operational threshold can include high/low and positive and negative values. For each event, e.g., each of the excessive conditions, there are a set of expected normal aircraft operation ranges. These ranges can be absolute values or, alternatively, these ranges can be changes in values over a period of time. Using the example provided above, a steady rise in aircraft engine temperature indicates that the engine has been started, a sustained high temperature within a known threshold, e.g., normal aircraft operations, indicates the engine is in continuous operation, and a steady decline in temperature indicates the engine has stopped and is cooling. The sensing system provides accurate detection of an event, yet also balances energy conserving techniques. In particular, the sensing system compares sensor data against a particular threshold and adjusts operational parameters of the sensor. The comparison can be done at the local sensor, e.g., sensor 2, or, alternatively, the comparison can be done at a remote location, e.g., access point 18. For example, if the engine temperature remains within the expected threshold, the sensing system can remain in a low-power state and provide sensor data less frequency, e.g., a reduced sampling rate. However, when the aircraft engine exceeds the operational threshold, e.g., the engine exceeds the absolute temperature range or the engine temperature spikes outside normal temperature change over time; the sensing system enters a high power state to provide more accurate sensor data, e.g., an increased sampling rate and a higher data resolution.

As another example, an event such as a landing gear overload condition is caused by excessive strain or stress on the landing gear structure. During an aircraft landing, the landing gear structure is subjected to high velocity impact. If the impact exceeds design thresholds an overload condition results. A sensing system can be implemented using strain sensors positioned proximate to the landing gear structure to identify stresses and strains, and, ultimately, predict an overload condition. In sum, threshold values for each event are typically contained within a range of values predetermined for a particular application.

In further embodiments, the sensing system adjusts threshold values to be within the normal aircraft operational range, to trigger operation of the sensing system even without detection of an event. For example, the thresholds can be set to a percentage of the normal aircraft operational range. Over time, the sensor data produced by the sensing system can be analyzed to determine long term health and status of aircraft components, e.g., the engine operated at a temperature above 90% of a normal operational value (or range) for a specified time period. The long term health and status can efficiently indicate to maintenance crews which parts of an aircraft require maintenance.

In some embodiments, sensing system 1 only detects events that occur during aircraft operation. For these events, transient measurements can erroneously cause sensing system 1 to enter a high energy state and waste power from energy source 16. To avoid transient measurements, processor 8 can compare sensor data at a time period to determine if an event is occurring or if a transient condition is present. After this determination, processor 8 can cause sensor 2 to adjust an operational parameter, which affects power draw from energy source 16. Adjusting the operational parameter can, for example, increase or decrease the sampling rate, increase or decrease signal resolution, cause processor 8 to store sensor data in memory 11, and cause processor 8 to transmit sensor data via wireless transceiver 6 to access point 18. A transient condition caused by, for example, vibration. Vibration is a strong indicator of aircraft operations, e.g., rotorcraft having spinning rotor blades introduces vibration throughout the airframe. However, vibration transients can also be caused by maintenance activity, e.g., loading or unloading the aircraft. Processor 8 can monitor the vibration measurements against a time period to determine if the aircraft is in operation, e.g., vibrations occurred over an extended time period, or if the aircraft is at rest, e.g., vibrations were mere transients.

Moreover, in further embodiments, each sensor can be paired with an accelerometer such that each sensor does not activate unless the aircraft is operational, or, alternatively the aircraft is at rest (depending on a desired implementation). In this way, triggering a high energy state for one type of sensor data collection for one sensor can depend on collection of a different type of sensor data from a different sensor. For example, the temperature sensor will not enter a high energy state unless the vibration sensor indicates the aircraft is operational.

Figure 2:
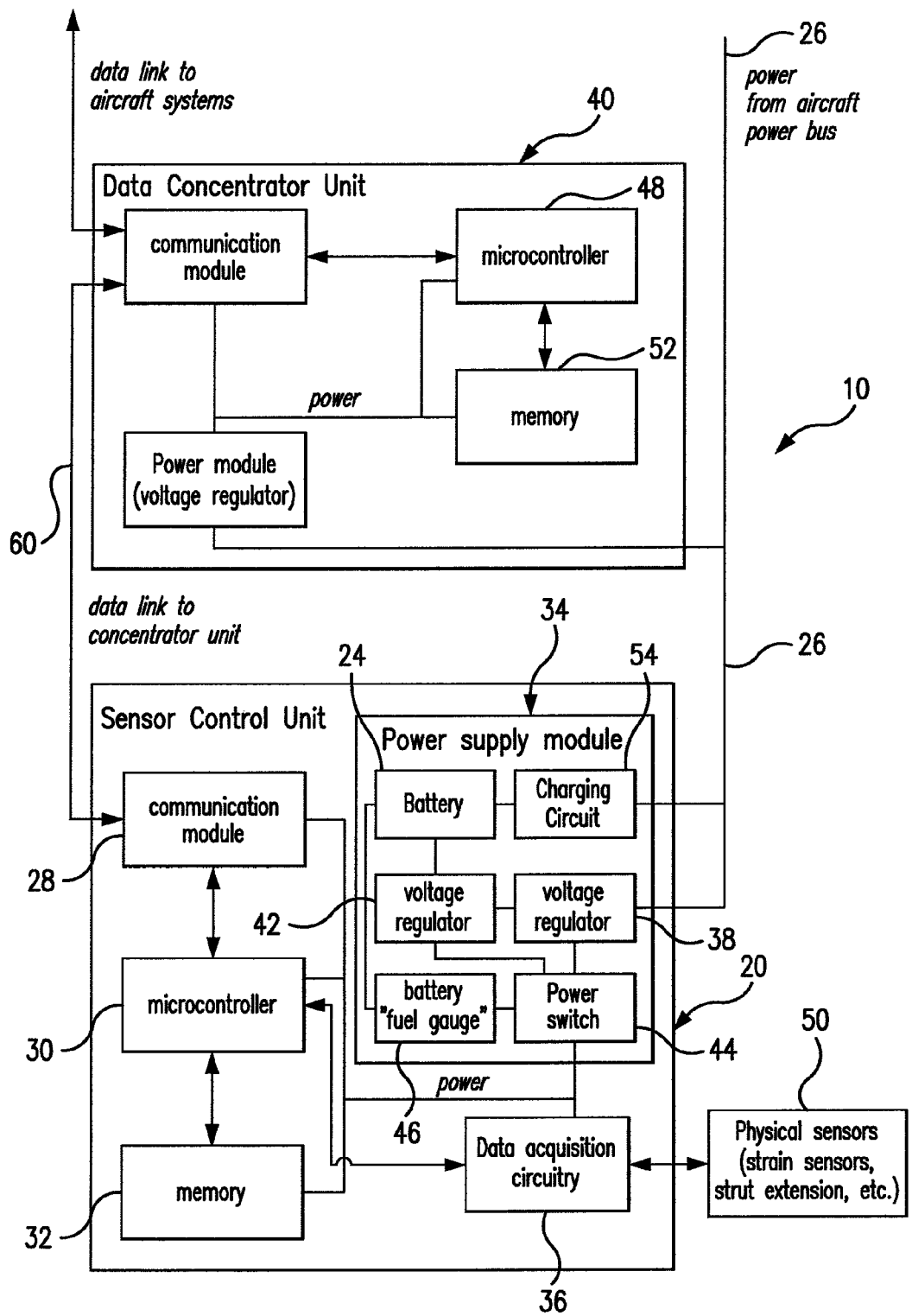
FIG. 2 is another block diagram of the health and status monitoring system configured to include a separate data concentrator unit.

FIG. 2 illustrates a health and status monitoring system which has been constructed in accordance with an embodiment of the present invention which has been designated as reference numeral 10.

System 10 uses a dual-power source concept. The aircraft's electrical power supply is used when available (i.e. when the aircraft is powered up) and battery power is used when the aircraft power is not available (e.g. when the aircraft is parked and powered down).

System 10 includes a sensor control unit 20, which is powered either from a rechargeable battery 24 or from the wired aircraft power supply 26. System 10 also includes a data concentrator unit 40, which is powered solely from the aircraft power supply system 26. Data concentrator unit 40 and the sensor control unit 20 are typically mounted in different locations on the aircraft. Sensor control unit 20 is preferably located close to sensors 50. Hence, the sensor control unit 20 needs to be small and lightweight. Sensor control unit 20 is powered, at times, from battery 24 and, accordingly, sensor control unit 20 is built using low-power components. Data concentrator unit 40 may require more power and may perform more detailed computations to calculate diagnosis of an event, e.g., an overload condition.

System 10, similar to sensor 2 of FIG. 1, employs variable mode sensing, via sensor control unit 20. Sensor control unit 20 includes: a communication module 28, a microcontroller 30, a memory 32, a power supply module 34 and data acquisition circuitry 36. Sensor control unit 20 directly communicates with sensors 50.

Sensors 50 are sensing elements, e.g., physical sensors, which include, but are not limited to capacitive strain sensors, vibration sensors, temperature sensors, pressure sensors. Data acquisition is performed through a specialized Application Specific Integrated Circuit (ASIC). Microcontroller 30 includes an AID converter that can be used to measure voltage; however, the A/D converter does not measure capacitance directly. In order to accomplish this, the measured capacitance needs to be converted to voltage. The ASIC converts the capacitance to voltage and then performs the A/D conversion. Preferably, a separate chip is used for each of sensors 50 so that all of sensors 50 are interrogated simultaneously facilitating synchronization of acquired data. Those skilled in the art will readily appreciate that there may be separate data acquisition chips for separate sensors, even though only one such chip, e.g., data acquisition circuitry 36, is shown in the diagram.

During data acquisition, data acquisition circuitry 36 energizes sensors 50, takes a reading and sends the reading to microcontroller 30. After this, sensors 50 are de-energized until a subsequent reading. The power consumed by the data acquisition circuitry 36 and sensors 50 depends on a frequency with which they are interrogated. In some sensor types, energizing the transducer (or the sensing element) first, and then performing the A/D conversion may be more energy consuming than other aspects of sensor operation. By reducing the sampling rate, the percentage of time when the transducer and A/D circuitry are energized is lower, which leads to lower energy use. Also, duration of the data acquisition operation, and hence the power consumption, depends on the bit resolution of A/D conversion. Lowering the bit resolution often results in a shorter conversion time, leading to a lower duty cycle and ultimately a lower energy usage.

Therefore, microcontroller 30 regulates the power level by adjusting the sensor sampling rate and the bit resolution. Note that the microcontroller 30 may analyze the acquired data and perform other functions during periods when the sensors are not being interrogated. Thus, activity levels including duty cycles of the microcontroller 30 and of sensors 50 may be decoupled, further lowering the power consumption without putting entire sensor control unit 20 to sleep.

System 10 further includes two voltage regulation circuits. A voltage regulator 38 is used to convert aircraft power supply 26 to a level required by system 10 since, typically, the aircraft power supply voltage is higher than system 10 requirements. A second voltage regulator 42 is used when the system is operated from the battery, whose voltage varies in relation to depletion of battery charge. Power management circuitry, i.e., a power switch circuit 44, is associated with power supply module 34 and selects the power source, e.g., aircraft power or battery power, depending on availability of the aircraft power. In a practical implementation, the function of these three modules may be performed by a single voltage regulator, which can handle both the battery and the aircraft power.

In FIG. 2, sensors 50 are shown outside of the sensor control unit 20 since control unit 20 does not require co-location with the actual physical sensors/transducers 50. In other implementations or embodiments (ref. FIG. 1), some sensors may be integrated with the control circuitry into a single physical module. However, some sensors may still be removed by a short distance from their respective control units and connected through a short wired connection (a so-called pigtail) or transmitting collected data wirelessly.

Figure 3:
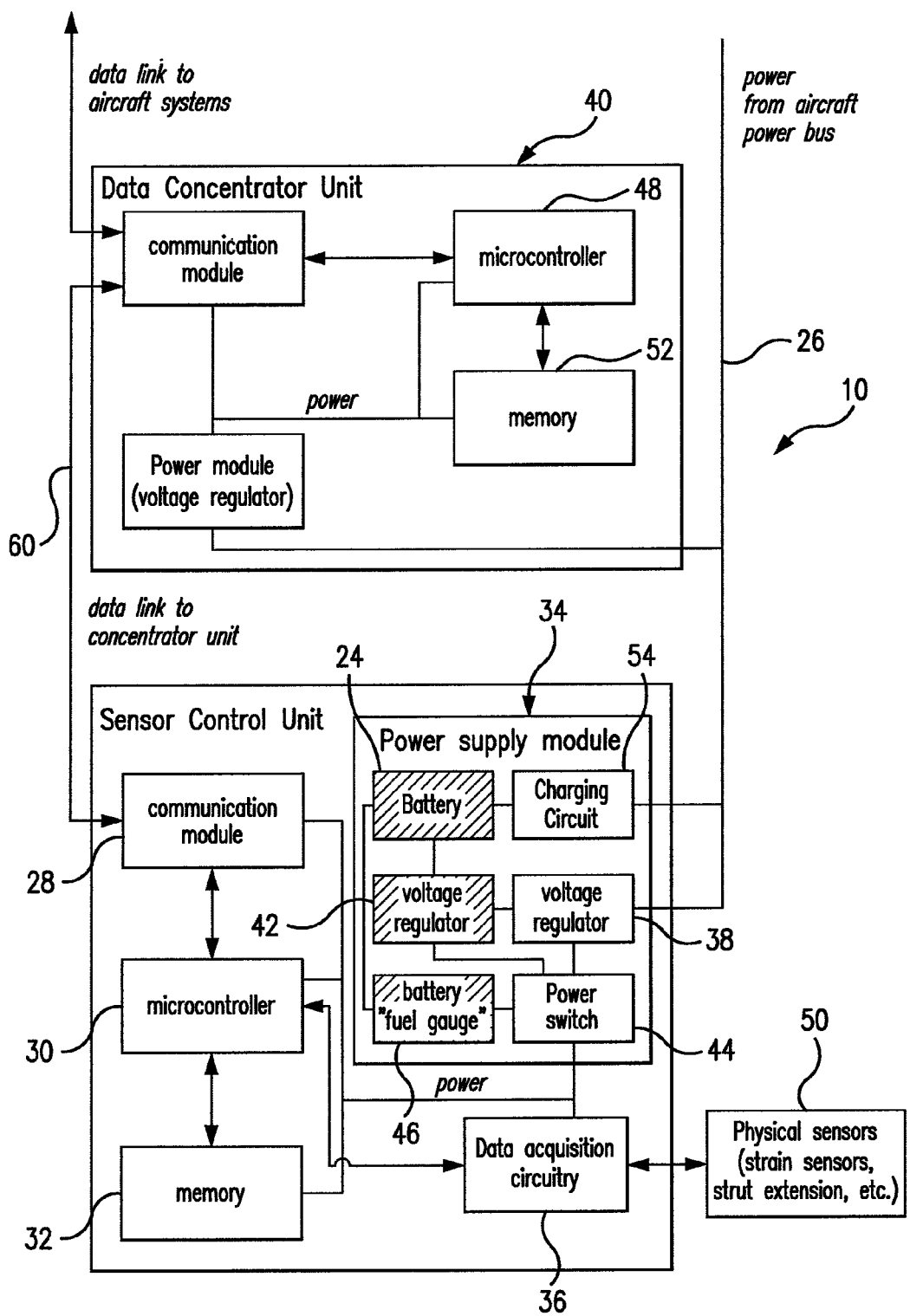
FIG. 3 is a block diagram of the health and monitoring system as illustrated in FIG. 2, wherein the data concentrator unit and a sensor control unit are powered by the aircraft's power bus.

When the aircraft power supply is available, monitoring system 10 operates on aircraft power. FIG. 3 illustrates the mode of operation for system 10 when aircraft power 26 is available. The elements shaded in gray, i.e., battery 24, voltage regulator 42 and battery fuel gauge 46, do not take part in system operation in this mode. Battery 24, within the sensor control unit 20, is recharged when system 10 operates on aircraft power and is not used as a power source. Further, in this mode, sensor control unit 20 can operate at a high data rate and bit resolution, since as electrical power is freely available and does not need to be conserved. Note that this mode of operation typically corresponds to take-off, flight, landing, or taxiing to and from the gate. For some embodiments, an event such as an overload condition typically occurs when system 10 operates on aircraft power. Accordingly, sensors 50 employ a high data rate and bit resolution during this time to capture strain measurements during this time.

The sensor data may be transmitted to data concentrator unit 40 using communication module 28 and over data link 60 soon after it has been acquired. Depending on the type of the data link, as explained later, all or only a part of the acquired sensor data may be sent to data concentrator unit 40. If only a portion of the sensor data is sent, then microcontroller 30, within the sensor control unit 20, performs suitable data reduction. Data reduction can be based on an approximate analysis of sensor data to assess if an event is more or less likely to occur. For example, the approximate analysis can compare the magnitude and duration of sensor data against a threshold set of conditions to determine if an event is occurring. However, this analysis will not be very accurate, due to the limited computational resources of sensor control unit 20 when operating on battery power. On the other hand, data concentrator unit 40 may include a more powerful microprocessor or microcontroller 48, and, therefore, data concentrator 40 can analyze the acquired data in greater detail. Analysis of the acquired data results in diagnosis data that is sent to the aircraft maintenance system. Acquired data can further be stored in memory module 52 for later use, together with the supporting sensor data. It may be advantageous that memory 52 is, at least in part, non-volatile in order to preserve a previous occurrence of an event, or event information. For example, if the event, e.g., an overload condition, occurs at the end of one taxiing period just prior to turning down the aircraft, it may be useful to have this information when the aircraft is powered up and ready to taxi again.

Figure 4:
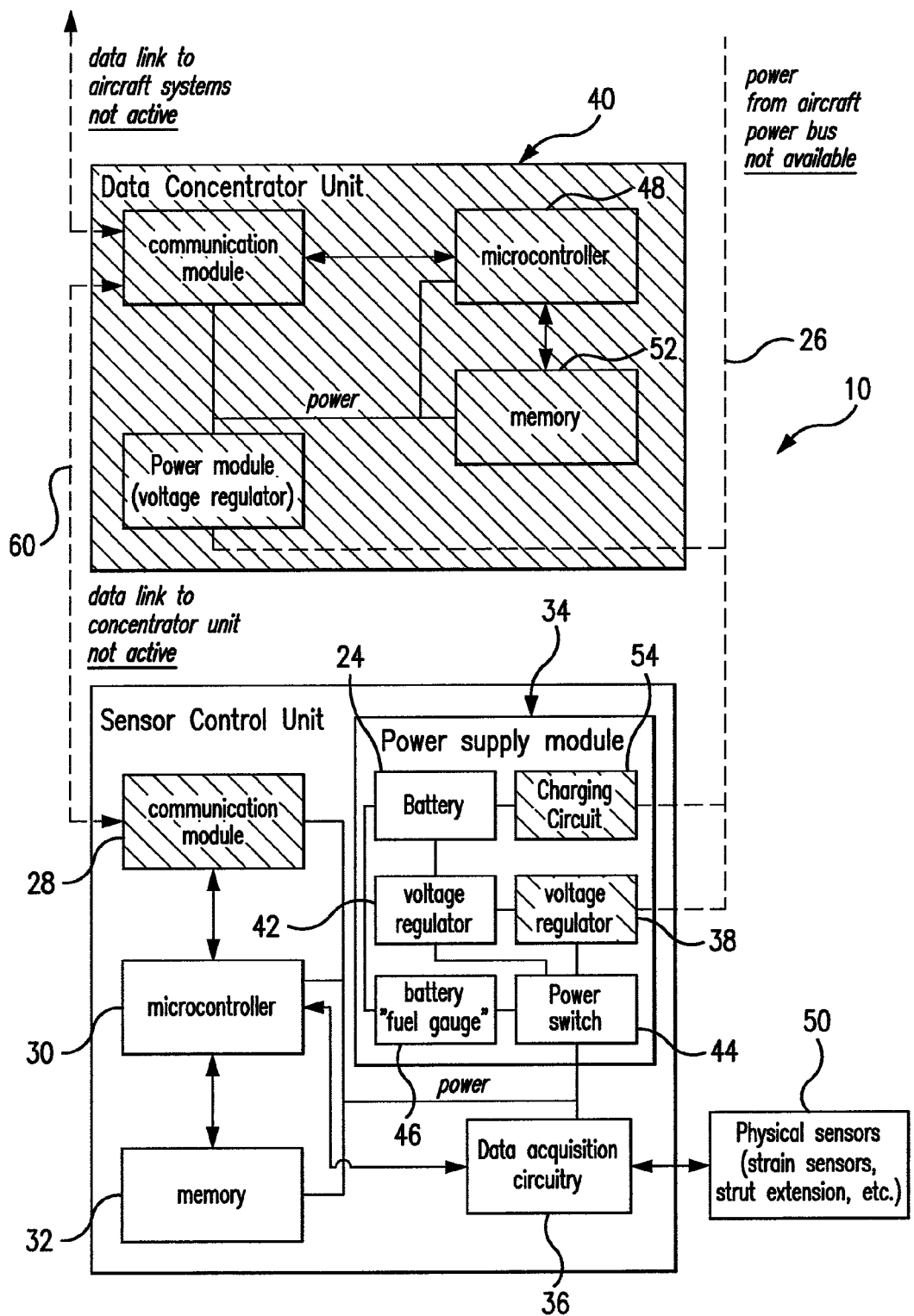
FIG. 4 is a block diagram of the landing gear health and monitoring system as illustrated in FIG. 2, wherein the data concentrator unit is shut down and the sensor control unit is being powered by a battery.

When the aircraft is not powered, the data concentrator unit 30 is switched off and the sensor control unit 20 internal rechargeable battery 24 as the power source. FIG. 4 illustrates the configuration of system 10 when the aircraft is not powered and the modules that are switched off. Accordingly, data concentrator unit 40, communication module 28, charging circuit 54, and first voltage regulator 38 are represented as shaded in gray. No data will be transmitted from the sensor control unit 20 to data concentrator unit 40 since data concentrator unit 40 is without power. Likewise, no data is sent to the aircraft maintenance system. This means that sensor control unit 20 must retain the data related to any potential events. To accommodate the possible case of the battery reaching a completely discharged state after an event is recorded, at least a part of the sensor control unit's memory 32 is non-volatile so that the data remains available once the aircraft is powered up again.

With the battery power being limited, the sensor control unit 20 interrogates sensors 50 at a lower sampling rate and with a lower bit resolution to conserve energy. Note that the independent power mode of operation can correspond to the case when the aircraft is parked, towed, or for embodiments illustrated in FIG. 1. For some applications, the expected rate of change of sensor readings may be much lower during independent power mode, than for example, during take-off or landing. Accordingly, for these applications, the total power consumption can be kept to a minimum during independent power operation. However, note that microcontroller 30 may be reading data sequentially from different sensors while operating at a slower rate. Also, after acquiring sensor data, microcontroller 30 performs analysis and decides whether the sampling rate should be increased. Depending on microcontroller type, these calculations may take a significant portion of the period between consecutive sensor readings. Thus, the sensors may be de-energized while microcontroller 30 is performing calculations.

Activation of High Data Rate Monitoring

An important feature of the monitoring system 10 is the rapid adjustment of its operation based on the sensed signals, so that possible events are not missed. The low power, low data rate operation can be suitable for monitoring conditions during the quiescent periods. However, when a suspected event occurs, the recorded data must be accurate enough to allow correct determination of whether the sensor measurements exceeded operational thresholds. This means that sensor data to be analyzed must be acquired at a high sampling rate and with high data resolution. Accordingly, system 10 adjusts operation when a suspected event may occur. This will be done based on a combination of decision criteria. The simplest approach is to define threshold values $\theta^{hi}$ and $\theta^{lo}$ for positive and negative measurements to identify a condition outside of the normal scope of operation. These detection thresholds may be different for individual sensors, based on their locations and event specific conditions, e.g., temperature, pressure, vibration and strain. When a sensor reading $x_i$ exceeds one of these thresholds, i.e. $x_i < \theta_i^{lo}$ or $x_i > \theta_i^{hi}$, the system may switch to high data rate operation.

Another criterion, used in conjunction with a simple level threshold, may be based on thresholds for rate of change. For example, the decision trigger may be $|x_i(t+\Delta) - x_i(k)|/\Delta > \alpha_i$ where $\Delta$ is the time step used to estimate the rate of change, and $\alpha_i$ is the corresponding threshold for the rate of change for the i-th sensor. Other, more complicated methods to estimate the rate of change may be used, as will be appreciated by those skilled in the art. Using the rate of change information the system may quickly increase the sensor sampling rate at the very beginning of an event, even if the measurement absolute values are still low. This may allow lowering the sample rate during the low-rate monitoring periods without sacrificing detection accuracy. Once the sample rate is increased, it would remain at a high rate for a prescribed period of time or until the data suggests that the event is passed.

Figure 5:
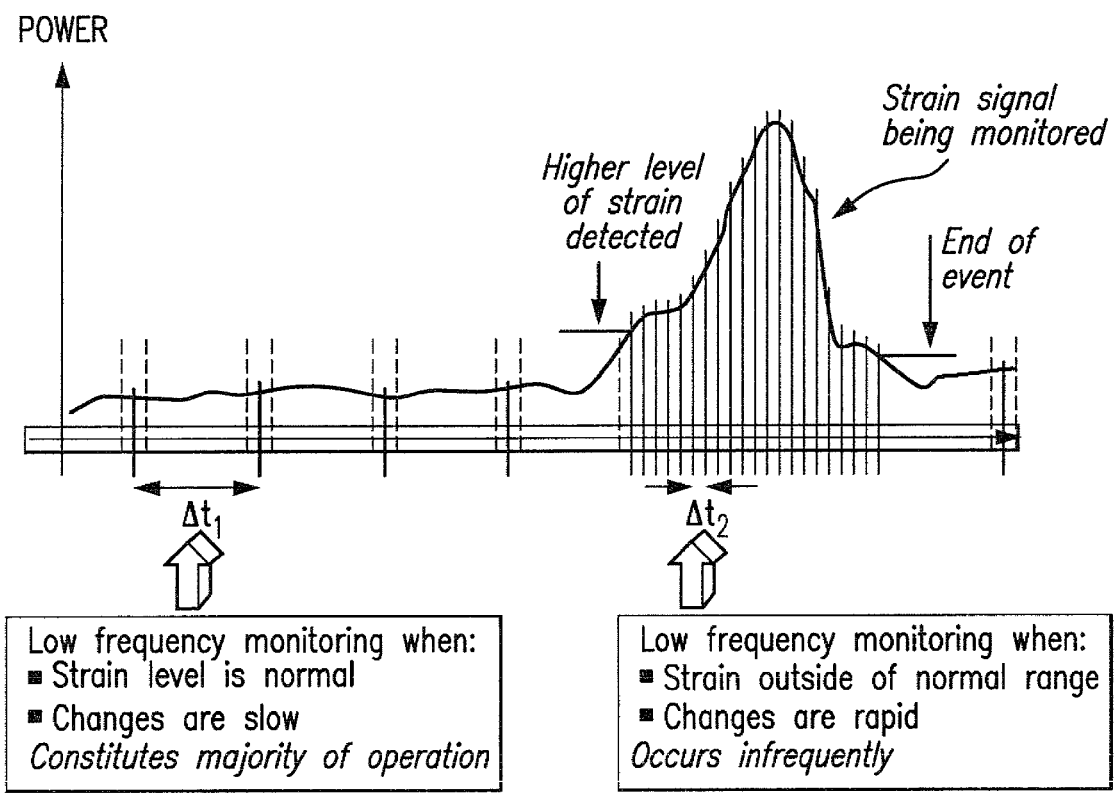
FIG. 5 is a graphical representation of an exemplary technique for variable rate monitoring that can be performed by the system illustrated in FIGS. 1 through 4.

FIG. 5 illustrates the general concept of switching between high and low sensor sampling rates for the case of a single sensor reading. Note that the end of the high-rate monitoring may be associated with another, lower threshold value. This will prevent the system from continual switching between the two data rates when the signal value is close to the threshold.

It should be noted that the threshold of individual signals may not be sufficient to capture all the possible event conditions. There is a possibility that, during particular events, none of the individual sensor measurements fall outside of its normal range, even though, taken collectively, the sensor measurements indicate a significant change of the conditions and thus, occurrence of an event. To account for this, microcontroller 30 can communicate with all of the sensors or, alternatively, receive additional sensor data from data concentrator 40, and sum the total condition measurements.

Although this discussion assumes only one low data rate mode and one high data rate mode, a system implementation may use more than two modes, with several data rates ranging from the lowest to the highest. For example, when measuring loads applied to the landing gear structure, the lowest data range corresponds to when the aircraft is completely still, and the highest data range corresponds to aircraft landing. In addition, for landing gear load applications, intermediate data rates may also be used to monitor stresses when there is some indication of aircraft movement, but the likelihood of a towing event is judged to be low. Switching between the multiple operating modes may be done based on multiple thresholds, as described above.

When a suspected event is over, sensor control unit 20 retains the acquired sensor data, so that it can be sent to the data concentrator unit 40 once the aircraft is again powered up. Because memory 30 may be limited, some data reduction may be required. For example, system 10 may retain data corresponding to a fixed time interval around the estimated peak stress instance. Microcontroller 30 can estimate the moment when the maximum measurements occurred and data before and after that moment may be retained. Alternatively, the extreme (maximum or minimum) values for individual sensors may be estimated, and intervals around each maximum or minimum may be used to bound the retained data. If such intervals overlap, because of the peak values occurring close to each other, then union of those intervals may be used for saving the sensors data. Various combinations of these methods are possible, as would be obvious to those skilled in the art.

When an aircraft is parked for a prolonged period, the system may activate the higher data rate monitoring multiple times. Some of those instances may not correspond to actual events. When multiple events are recorded, the memory available on the sensor control unit may be insufficient to retain all the data. Subsequently the data corresponding to less severe loads may be overwritten with new data. For this, each event record should be accompanied by an indicator, or a set of indicators associated with the estimated severity of the event. This may include the peak measurement values. The number of events recorded and their length will depend on a tradeoff between the necessary accuracy of event detection and the cost, size and energy use of a larger memory unit.

It is envisioned that system 10 can be modified in a number of ways based on the particular application or aircraft without departing from the inventive aspects of the present disclosure. Several variants of the system architecture are described below that do not affect the general idea of the system. All the concepts discussed above apply to all the variants below.

Single vs. Multiple Sensor Units

The preceding disclosure involved a single sensor control unit communicating with the data concentrator unit. In some system implementations more then one sensor control unit may be used with the same data concentrator unit. For example, more than one cluster of sensors may be used depending on implementation. For example, discussed-above, detection of temperature related events may require multiple sensors placed on an engine compartment and exhaust ports. In this case it may be not practical to connect them both to the same sensor control unit. Instead, it may be advantageous to have one group of sensors located close to each other connected to one unit, while other sensors may be connected to other units. When the aircraft is powered up, the batteries of all sensor control units can be recharged from the aircraft power supply system. When the aircraft is un-powered, each sensor control unit operates on its own battery and decides autonomously when and how to adjust the sensor sampling rates. Because each unit only has a partial picture of the overall event, the thresholds used to activate the higher data rate mode may be appropriately lowered to avoid missing some of possible events.

Location of the Data Concentrator

In the diagrams the data concentrator unit is drawn as physically separate from the sensor control unit. In some implementations, these two units may be just two functional modules within the same physical enclosure. The module described above as the data concentrator may use a high-powered processor necessary for accurate event estimation. This module may need much more energy and thus will be powered from the aircraft's power supply. The module described as the sensor control unit may use a low-power microcontroller and may be used when the aircraft is powered down. This unit may perform only approximate signal analysis and uses accordingly less power; therefore it may be powered from the battery. Even if the two units are collocated, all the system concepts described above may apply.

Elimination of the Data Concentrator Unit

In certain applications, a data concentrator unit may not be required. As noted above, one function of the data concentrator unit is to perform complex and energy consuming calculations in order to determine if an event has occurred. The data concentrator unit also serves to convert the data from a format used by the sensor control unit to the native format of the aircraft main computer. However, these functions can be incorporated into the aircraft's main computer, the aircraft's Health and Usage Monitoring System and/or the sensor control unit making the data concentrator unit unnecessary. However, one disadvantage to eliminating the data concentrator unit is that it may require the size of the sensor control unit to be increased which in certain applications is undesirable.

Wireless vs. Wired Data Transfer

Data transfer between the sensor control unit (or units) and the data concentrator may be via a wired connection, using any of the standard data transfer protocols used in avionics. Alternatively, wireless data transfer may be used (ref. FIG. 1) since providing a data connection may be too costly and cumbersome. Typically, data transfer wiring is more complex than power supply wiring, and may require additional design and installation. Also, the overall system weight may be driven up by data wires. For these reasons, the data links between the sensor control unit (or units) and the data concentrator, as well as between the physical sensors and the sensor control unit, may be implemented using wireless technology.

Data Recipient: Aircraft System vs. Ground Base Station vs. Handheld Receiver

In the system diagrams provided in FIGS. 1-4, the recorded sensor data and the event diagnosis is sent to the aircraft management computer or another avionics system installed in the aircraft. This approach presumes that the aircraft management system is designed to accept and process such data. In retrofit applications the existing aircraft computer system may be not able to interface to a newly installed monitoring sensor system. In this case the monitoring sensor system may be designed to transfer its data to a handheld device operated, for example, by a ground mechanic. This connection may be accomplished wirelessly, through a wire temporarily plugged into a connector in the data concentrator unit, or via a memory device (such as flash drive) plugged into the data concentrator unit and then to the handheld device. Another alternative may be a wireless connection to a ground station computer used by the maintenance crew. Regardless of the final destination of the data, all the system concepts described above still apply.

Those skilled in the art will readily appreciate that the monitoring systems and methods disclosed herein could also utilize additional sensors for dictating or determining whether the system should increase the sampling rate and data resolution. For example, an accelerometer could alert the system as to when the aircraft is being jacked up or towed.

Moreover, although the previously described embodiments utilize a rechargeable battery as the secondary energy source for the system, other energy sources, such as energy harvesting can be employed if practicable based on the environment in which the system is deployed.

While described above in the exemplary contest of microcontrollers, those skilled in the art will readily appreciate that any suitable processor can be used. A typical processor is configured of logic circuitry and responds to and executes instructions. The term "module" is used herein to denote a functional operation that may be embodied either as a stand-alone component or as an integrated configuration of a plurality of sub-ordinate components.

While the subject invention has been described with respect to preferred embodiments, those skilled in the art will readily appreciate that changes and modifications may be made thereto without departing from the spirit and scope of the subject invention as defined by the appended claims.

What is claimed is:

1. A situation-aware sensing system for aircraft monitoring comprising:

an independent power source;

a sensor that continuously measures a signal of interest to yield sensor data which is recorded and is indicative of an operational condition external to the system; and a processor that compares the sensor data to a threshold based on an operational range of values for the operational condition external to the system, and adjusts an operational parameter of the situation-aware sensing system to conserve power when the sensor data does not exceed the threshold, wherein the processor adjusts the operational parameter to stop conserving power when the sensor data exceeds the threshold, and wherein the sensor and the processor continuously draw power from the independent power source.

2. The system of claim 1, wherein the operational parameter includes a sampling rate and a data resolution.

3. The system of claim 1, further comprising:
a dependent power source; and
power management circuitry that switches the situation-aware sensing system from the independent power source to the dependent power source if aircraft power is present.

4. The system of claim 3, wherein the power management circuitry is further configured to recharge the independent power source when the aircraft power is present.

5. The system of claim 1, further comprising:
a memory, wherein the processor stores the sensor data in the memory when the sensor data exceeds the threshold data to yield an event record.

6. The system of claim 5, further comprising
a wireless transceiver; and
an access point, and
wherein the processor transmits the event record from the memory to the access point, via the wireless transceiver.

7. The system of claim 1, wherein the threshold data includes an absolute value of a normal operating range of an aircraft, and a rate change in a measured value in time.

8. The system of claim 1, wherein the signal of interest is one selected from the group consisting of: a temperature, a vibration, a strain, a pressure and an acceleration.

9. The system of claim 1, wherein the sensor is a first sensor, the system further comprising:
a second sensor that continuously measures a different signal of interest, wherein the processor further analyzes the different signal of interest throughout a period of time to determine if a transient condition is present, and
wherein the processor adjusts the operational parameter of the situation-aware sensing system to conserve power if the transient condition is present regardless of the threshold data.

10. The system of claim 9, wherein the second signal of interest is a vibration signal.

11. The system of claim 1, wherein when the processor adjusts the operational parameter to stop conserving power the processor causes the situation-aware sensing system to change between a low-power mode to a higher-energy mode.

12. A method for aircraft monitoring using situation-aware sensing comprising:
continuously drawing power from an independent power source;
continuously measuring a signal of interest to yield sensor data which is recorded and is indicative of an operational condition external to the system;
comparing the sensor data to a threshold based on an operational range of values for the operational condition external to the system;
adjusting an operational parameter of a situation-aware sensor to conserve power when the sensor data does not exceed the threshold; and
adjusting an operational parameter of the situation-aware sensor to stop conserving power when the sensor data exceeds the threshold.

13. The method of claim 12, further comprising:
continuously measuring a different signal of interest
comparing the different signal of interest to a period of time to determine if a transient condition is present;
adjusting an operational parameter of the situation-aware sensing system to conserve power if the transient condition is present regardless of the comparison of the sensor data to the threshold data.

14. The system of claim 12, wherein the operational parameter includes a sampling rate and a data resolution, wherein the threshold data includes an absolute value of a normal operating range of an aircraft and a rate of change in a measured value in time.

15. The system of claim 12 further comprising:
storing the sensor data in a memory when the sensor data exceeds the threshold data to yield an event record,
wirelessly transmitting the event record to an access point.

16. A situation-aware sensing system for aircraft monitoring comprising:
an independent power source;
a sensor that continuously measures a signal of interest to yield sensor data which is recorded and is indicative of an operational condition external to the system; and
a processor that is configured to adjust an operational parameter of the situation-aware sensing system to conserve power when the sensor data is within a first operational range and adjusts the operational parameter of the situation-aware sending system to stop conserving power when the sensor data is within a second operational range, wherein the first and second operational ranges are based on the operational condition external to the system.

* * * * *